United States Patent
Pfirrmann et al.

(10) Patent No.: US 10,196,530 B2
(45) Date of Patent: Feb. 5, 2019

(54) METHOD FOR INCREASING ADHESION BETWEEN A CHROMIUM SURFACE AND A LACQUER

(71) Applicant: Atotech Deutschland GmbH, Berlin (DE)

(72) Inventors: Christina Pfirrmann, Berlin (DE); Philipp Wachter, Berlin (DE); Philip Hartmann, Berlin (DE); Nancy Born, Berlin (DE); Juan-Carlos Umaran, Berlin (DE)

(73) Assignee: Atotech Deutschland GmbH, Berlin (DE)

( * ) Notice: Subject to any disclaimer, the term of this patent is extended or adjusted under 35 U.S.C. 154(b) by 14 days.

(21) Appl. No.: 15/516,940

(22) PCT Filed: Jan. 5, 2016

(86) PCT No.: PCT/EP2016/050069
§ 371 (c)(1),
(2) Date: Apr. 5, 2017

(87) PCT Pub. No.: WO2016/113148
PCT Pub. Date: Jul. 21, 2016

(65) Prior Publication Data
US 2018/0273775 A1    Sep. 27, 2018

(30) Foreign Application Priority Data

Jan. 13, 2015 (EP) ..................... 15150950

(51) Int. Cl.
| | | |
|---|---|---|
| *C25D 5/12* | (2006.01) | |
| *C25D 5/34* | (2006.01) | |
| *C23C 28/00* | (2006.01) | |
| *C09D 7/65* | (2018.01) | |
| *C09D 5/00* | (2006.01) | |
| *C09D 5/44* | (2006.01) | |
| *C09D 7/63* | (2018.01) | |
| *C25D 11/36* | (2006.01) | |
| *C25D 17/10* | (2006.01) | |

(52) U.S. Cl.
CPC .............. *C09D 7/65* (2018.01); *C09D 5/002* (2013.01); *C09D 5/448* (2013.01); *C09D 7/63* (2018.01); *C25D 11/36* (2013.01); *C25D 17/10* (2013.01)

(58) Field of Classification Search
CPC ....... C23C 18/1653; C23C 28/00; C25D 5/12; C25D 5/34; C25D 5/40
USPC ................. 205/199, 219, 178, 188
See application file for complete search history.

(56) References Cited

U.S. PATENT DOCUMENTS

| | | |
|---|---|---|
| 3,928,157 A | 12/1975 | Suematsu et al. |
| 4,048,374 A * | 9/1977 | Kotzsch ............... B05D 7/14 427/384 |
| 6,174,426 B1 | 1/2001 | Osanaiye |
| 7,597,935 B2 | 10/2009 | Xu et al. |
| 2011/0272284 A1 | 11/2011 | Elbick et al. |
| 2012/0052319 A1 | 3/2012 | Sugawara et al. |

FOREIGN PATENT DOCUMENTS

| | | |
|---|---|---|
| DE | 10051486 | 4/2002 |
| EP | 2186928 | 5/2010 |
| EP | 2826890 | 1/2015 |
| EP | 3045565 | 3/2017 |
| WO | 2010057001 | 5/2010 |

OTHER PUBLICATIONS

PCT/EP2016/050069; PCT International Search Report and Written Opinion of the International Searching Authority dated Apr. 12, 2016.
PCT/EP2016/050069; PCT International Preliminary Report on Patentability dated Sep. 21, 2016.

* cited by examiner

*Primary Examiner* — Edna Wong
(74) *Attorney, Agent, or Firm* — Renner, Otto, Boisselle & Sklar, LLP

(57) ABSTRACT

The present invention concerns a method for increasing the adhesion between a chromium surface and a lacquer wherein said chromium surface is contacted with an aqueous solution comprising at least one phosphorous compound according to formulae $R^1$—$P(O)(OR^2)(OR^3)$ 1 and $R^1$—O—$P(O)(OR^2)(OR^3)$ 2 wherein $R^1$ is a $C_1$ to $C_{12}$ alkyl group, linear, branched or cyclic comprising at least one polar residue and $R^2$ and $R^3$ are independently selected from the group consisting of hydrogen, lithium, sodium, potassium, ammonium and $C_1$ to $C_4$ alkyl while passing an external electrical current through said substrate and at least one anode wherein said substrate serves as the cathode.

20 Claims, No Drawings

METHOD FOR INCREASING ADHESION BETWEEN A CHROMIUM SURFACE AND A LACQUER

The present application is a U.S. National Stage Application based on and claiming benefit and priority under 35 U.S.C. § 371 of International Application No. PCT/EP2016/050069, filed 5 Jan. 2016, which in turn claims benefit of and priority to European Application No. 15150950.2 filed 13 Jan. 2015, the entirety of both of which is hereby incorporated herein by reference.

FIELD OF THE INVENTION

The present invention relates to a wet-chemical method for improving the adhesion between a chromium surface, particularly an electroplated chromium surface, and a lacquer.

BACKGROUND OF THE INVENTION

Chromium surfaces are used in various applications such as a decorative metal finish for plastic parts in automotive industry and sanitary equipment. The chromium surface is usually the outer surface of the substrate and obtained by electroplating a chromium layer from plating bath compositions comprising either Cr(III) ions, Cr(VI) ions or both.

In some applications, at least one other metal or metal alloy layer is located between said chromium layer and the substrate. The at least one metal or metal alloy layer is selected from one or more of nickel layer, nickel alloy layer, copper layer and copper alloy layer.

The chromium layer usually comprises micro-cracks after plating or (thermal) annealing, or pores created by an underlying micro-porous nickel layer. Hence, also the layer material(s) between the chromium layer and the substrate are exposed to the environment. The chromium oxide layer formed on the outer surface of the chromium layer protects said outer surface of the chromium layer from corrosion but not the underlying layer(s). Such multilayer assemblies comprising a chromium layer as the outermost layer are for example disclosed in US 2012/0052319 A1.

The resulting chromium surface is usually very shiny and fulfils aesthetic requirements. However, in some applications one or more layers and/or types of a lacquer are applied to said chromium surface.

Typical lacquers applied to chromium surfaces comprise e.g. polyurethane-based lacquers and epoxy-based lacquers.

The adhesion between an untreated chromium surface and a lacquer is not sufficient.

Accordingly, different methods to increase the adhesion between a chromium surface and a lacquer are known in the art:

Functional organophosphonic acid esters as adhesion promoting agents for metal surfaces are disclosed in U.S. Pat. No. 4,048,374 A. The metal surface is immersed in a solution comprising an organophosphonic acid ester without applying an external electrical current to the metal surface. The adhesion between a metal surface and a lacquer is not sufficiently improved when the metal surface to be treated is a chromium surface (Example 2, present invention).

An adhesion promoting agent for lacquers on a metal surface is also disclosed in DE 100 51 486 A1. Said adhesion promoting agent contains at least two compounds each comprising a functional group selected from COOH, $HSO_3$, $HSO_4$, $(OH)_2PO$, $(OH)_2PO_2$, $(OH)(OR^2)PO$ and $(OH)(OR^2)PO_2$ wherein $R^2$ is selected from linear and branched $C_1$ to $C_{10}$ alkyl. Application of an external electrical current to the metal surface during such treatment is not disclosed. The adhesion between a chromium surface and a lacquer is not sufficiently improved by said method (Example 2, present invention).

An anodic treatment of metal surfaces with an aqueous solution comprising a compound having hydrophobic carbon-chains with hydrophilic anionic functional groups is disclosed in EP 2 186 928 A1. Residues creating a foggy appearance remain on the chromium surface after the anodic treatment after rinsing with water (Example 3, present invention). Hence, said method is not suitable to increase the adhesion of a chromium surface and maintain the optical properties of said chromium surface, i.e. the shiny and decorative optical appearance when an optically transparent lacquer is deposited onto the treated chromium surface.

Objective of the Present Invention

It is the objective of the present invention to provide a wet-chemical method for increasing the adhesion between a chromium surface and a lacquer while maintaining the optical appearance of the chromium surface after deposition of an adhesion promoter.

SUMMARY OF THE INVENTION

This objective is solved by a method for increasing the adhesion between a chromium surface and a lacquer comprising, in this order, the steps of
(i) providing a substrate comprising a chromium surface,
(ii) contacting said substrate with an aqueous solution comprising at least one phosphorous compound according to formulae 1 and/or 2

  1

  2 wherein $R^1$ is a $C_1$ to $C_{12}$ alkyl group, linear, branched or cyclic and comprising at least one residue selected from the group consisting of phosphonate, phosphate, carboxylate, carboxyl, hydroxyl, amino, amide, thiol, nitrile, isonitrile, cyanate, isocyanate, epoxy, halogenide, alkenyl, ureido and thioureido, and $R^2$ and $R^3$ are independently selected from the group consisting of hydrogen, lithium, sodium, potassium, ammonium and $C_1$ to $C_4$ alkyl, wherein the $C_1$ to $C_{12}$ alkyl group in $R^1$ can be interrupted by —O— and/or —N($R^4$)— with $R^4$ selected from hydrogen and $C_1$ to $C_4$ alkyl,
while passing an electrical current through said substrate, at least one anode and the aqueous solution wherein said substrate serves as the cathode and thereafter
(iii) depositing a lacquer onto said substrate
and thereby increasing the adhesion between said substrate and said lacquer.

The increased adhesion between the substrate comprising a chromium surface and the lacquer is obvious from testing the water resistance of coatings using water immersion (ASTM D870-09) followed by a cross-cut test/tape test (ISO 2409:2013). Furthermore, the desired shiny appearance and colour of the chromium surface are maintained after deposition of the adhesion promoter in step (ii).

DETAILED DESCRIPTION OF THE INVENTION

Chromium surfaces to which the method for increasing the adhesion between a chromium surface and a lacquer according to the present invention can be applied comprise chromium layers deposited by chemical and/or physical vapour deposition methods or by wet-chemical deposition methods such as electroplating from plating bath compositions comprising Cr(III) ions, Cr(VI) ions or both.

Preferably, the method for increasing the adhesion between a chromium surface and a lacquer according to the present invention is applied to chromium surfaces obtained by electroplating.

In one embodiment of the present invention, at least one intermediate layer(s) selected from the group consisting of nickel, nickel alloys, copper and copper alloys is located between the substrate and the chromium layer whose surface is exposed. The at least one intermediate layer is often required to obtain a smooth and shiny chromium surface because the chromium layer itself is very thin and cannot level the roughness imposed by the surface of the substrate.

The chromium surface layer usually comprises microcracks which can be created during electroplating and/or by (thermal) annealing. Another type of chromium layers having a micro-porosity is formed by electroplating the chromium layer on top of a nickel or nickel alloy—composite layer which comprises small particles of a non-conductive substance such as silica and/or alumina.

The adhesion between such chromium surfaces and a lacquer is insufficiently low. Accordingly, the lacquer delaminates from the chromium surface and/or is prone to undesired blistering.

The substrate comprising a chromium surface is provided in step (i) and then contacted with an aqueous solution in step (ii).

The substrate comprising a chromium surface is optionally degreased and/or cleaned before step (ii). The substrate, particularly the chromium surface, can be degreased and/or cleaned for example by one or more methods such as treatment in organic solvents, alkaline cleaners and anodic or cathodic treatment in a cleaner solution. All those cleaning and degreasing methods are known in the art.

Phosphorous compounds according to formulae 1 and 2 are commercially available e.g. under the trade names Dequest® (Italmatch Chemicals), and Rhodafac® and Albritect® (Rhodia).

The syntheses of phosphonic acid esters comprising an alkyl-epoxy residue (e.g. 3-glycidyloxypropanephosphonic acid) are for example disclosed in U.S. Pat. No. 4,048,374 A.

Preferably, $R^1$ of the at least one phosphorous compound according to formulae 1 and/or 2 is a $C_1$ to $C_{12}$ alkyl group, linear, branched or cyclic, comprising at least one residue selected from the group consisting of phosphonate, phosphate, carboxylate, carboxyl, hydroxyl, amino; and $R^2$ and $R^3$ are independently selected from the group consisting of hydrogen, lithium, sodium, potassium, ammonium and $C_1$ to $C_4$ alkyl.

The concentration of the at least one phosphorous compound according to formulae 1 and/or 2 in the aqueous solution preferably ranges from 0.0001 to 0.5 mol/l, more preferably from 0.0005 to 0.05 mol/l and most preferably from 0.001 to 0.025 mol/l.

The aqueous solution optionally further comprises at least one additive which increases the solubility of the at least one phosphorous compound according to formulae 1 and/or 2. This additive is preferably a polyether compound such as alkoxylated bisphenols, polyethyleneoxide, polypropyleneoxide, and ethylene-oxide-propyleneoxide block-, alt- and/or ran-copolymers.

Suitable polyether compounds and the concentration range of such an additive can be determined by routine experiments: the phosphorous compound according to formulae 1 and/or 2 and said additive are mixed in water and the cloudiness of the resulting mixture is determined by visual inspection. A clear or only slightly cloudy mixture is suitable for the method according to the present invention. A cloudy mixture is not desired.

More preferably, the at least one optional additive which increases the solubility of the at least one phosphorous compound according to formulae 1 and/or 2 is selected from compounds represented by formula 3

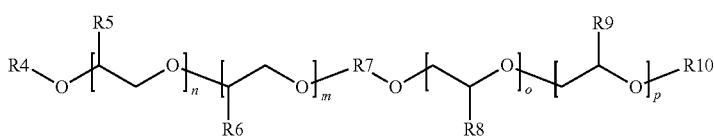

The aqueous solution applied in step (ii) of the method according to the present invention comprises at least one phosphorous compound according to formulae 1 and/or 2

$$R^1—P(O)(OR^2)(OR^3) \quad\quad 1$$

$$R^1—O—P(O)(OR^2)(OR^3) \quad\quad 2$$

wherein $R^1$ is a $C_1$ to $C_{12}$ alkyl group, linear, branched or cyclic and comprising at least one residue selected from the group consisting of phosphonate, phosphate, carboxylate, carboxyl, hydroxyl, amino, amide, thiol, nitrile, isonitrile, cyanate, isocyanate, epoxy, halogenide, alkenyl, ureido and thioureido, and $R^2$ and $R^3$ are independently selected from the group consisting of hydrogen, lithium, sodium, potassium, ammonium and $C_1$ to $C_4$ alkyl, wherein the $C_1$ to $C_{12}$ alkyl group in $R^1$ can be interrupted by —O— and/or —N($R^4$)— with $R^4$ selected from hydrogen and $C_1$ to $C_4$ alkyl.

wherein m, n, o and p are integers ranging from 0 to 200 and are the same or different and m+n+o+p is at least 2. Preferably m+n+o+p ranges from 4 to 100, more preferably from 10 to 50.

R4 and R10 are the same or different and are selected from the group consisting of H, a suitable counter ion like $Li^+$, $Na^+$, $K^+$, $NH_4^+$, $C_1$-$C_{20}$-alkyl, substituted or unsubstituted, linear or branched; $C_1$-$C_6$-alkaryl, linear or branched; allyl, aryl, sulfate, phosphate, halide and sulfonate.

R5, R6, R8 and R9 groups may be the same or different and are selected from the group consisting of H, $C_1$-$C_6$-alkyl, linear or branched, substituted or unsubstituted.

R7 is selected from the group consisting of $C_1$-$C_{12}$-alkylene, linear or branched, substituted or unsubstituted; arylene 1,2-, 1,3- and 1,4-substituted; naphthylene, 1,3-, 1,4-1,5-1,6- and 1,8-substituted; higher annulated arylene, cylcloalkylene, —$CH_2$—$CH(CH_2(OCH_2CH_2)_nOR_4)$—, and wherein R4 and n have the meaning defined above, and moieties represented by formula 4

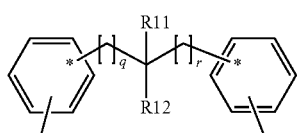

4 wherein the substitution independently is 1,2-, 1,3- or 1,4 for each ring and wherein q and r are the same or different and range independently from 0 to 10, and R11 and R12 are selected independently from the group consisting of H and $C_1$-$C_6$-alkyl, linear or branched.

Substituted alkyl, alkaryl and aryl groups described herein are hydrocarbyl moieties which are substituted with at least one atom other than carbon and hydrogen, including moieties in which a carbon chain atom is substituted with a hetero atom such as nitrogen, oxygen, silicon, phosphorous, boron, sulfur, or a halogen atom. The hydrocarbyl moieties may be substituted with one or more of the following substituents: halogen, heterocyclo, alkoxy, alkenoxy, alkynoxy, aryloxy, hydroxy, protected hydroxy, hydroxycarbonyl, keto, acyl, acyloxy, nitro, amino, amido, nitro, phosphono, cyano, thiol, ketals, acetals, esters and ethers.

Preferred are additives wherein R4 and R10 of the additive according to formula 3 are selected independently from the group consisting of H, methyl, sodium, potassium, halide, sulfate, phosphate and sulfonate.

Preferred are additives wherein R5, R6, R8 and R9 of the additive according to formula 3 are selected independently from the group consisting of H, methyl, ethyl, n-propyl and isopropyl.

Preferred are additives wherein R7 of the additive according to formula 3 is selected from the group represented by formulae 5 and 6

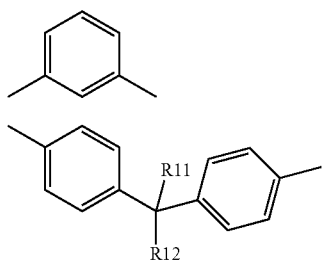

wherein R11 and R12 are selected from the group consisting of H, methyl, ethyl, n-propyl and isopropyl.

Particularly preferred optional additives increasing the solubility of the at least one phosphorous compound according to formulae 1 and/or 2 have the following formulae 7 to 9:

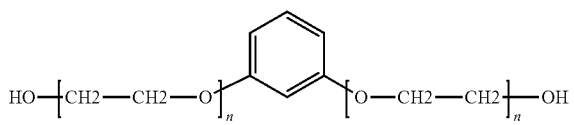

wherein n ranges from 1 to 20, preferably from 3 to 8.

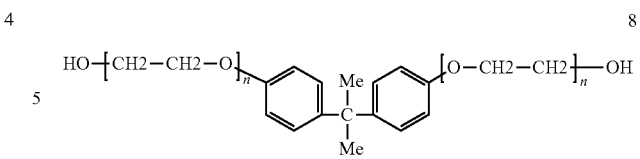

wherein n ranges from 1 to 20, preferably from 2 to 10.

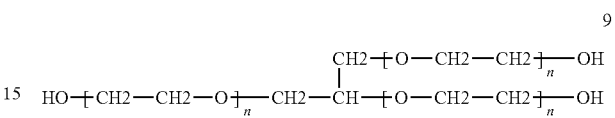

wherein n ranges from 1 to 20, preferably from 2 to 7.

The concentration of the at least one optional additive which increases the solubility of the at least one phosphorous compound according to formulae 1 and/or 2 preferably ranges from 0.0001 to 0.1 mol/l, more preferably from 0.0005 to 0.05 mol/l and most preferably from 0.001 to 0.005 mol/l.

The aqueous solution comprising at least one phosphorous compound according to formulae 1 and/or 2 optionally further comprises a co-solvent which may improve the solubility of said at least one phosphorous compound in the main solvent water. The optional co-solvent is preferably a polar organic solvent selected from the group consisting of alcohols such as ethanol, iso-propanol, butanol; alkyl ethers of glycols such as 1-methoxy-2-propanol, monoalkyl ethers of ethylene glycol, diethylene glycol, propylene glycol, butyl glycol, ketones such as methyl ethyl ketone, methyl isobutyl ketone, isophorone; esters and ethers such as 2-ethoxyethyl acetate and 2-ethoxyethanol.

The concentration of the optional co-solvent calculated from the total amount of all solvents present (water and co-solvent(s)) preferably ranges from 0.0001 to 40 wt.-%, more preferably from 0.01 to 20 wt.-% and most preferably from 0.1 to 10 wt.-%.

In a preferred embodiment of the present invention, the aqueous solution comprises at least one phosphorous compound according to formulae 1 and/or 2, at least one additive which increases the solubility of said at least one phosphorous compound and at least one co-solvent.

The aqueous solution may further comprises anti-foam additives which are known in the art, and a conducting salt such as sodium and/or ammonium acetate, or sodium and/or ammonium phosphates and anionic surfactants such as sodium dodecyl sulfate.

The pH value of the aqueous solution comprising at least one phosphorous compound according to formulae 1 and/or 2 preferably ranges from 1 to 10, more preferably from 1.5 to 8 and most preferably from 2 to 7.

The substrate comprising a chromium surface is brought into contact with said aqueous solution by dipping said substrate into said aqueous solution, by spraying said aqueous solution onto said substrate or by brushing said aqueous solution onto said substrate.

Furthermore, an external electrical current is passed through the substrate comprising a chromium surface, the aqueous solution comprising at least one phosphorous compound according to formulae 1 and/or 2 and at least one anode. The substrate comprising a chromium surface serves as the cathode in the method for increasing the adhesion between a chromium surface and a lacquer according to the present invention. Only then the required adhesion between the substrate comprising a chromium surface and the lacquer is achieved while the desired optical properties of the chromium surface such as shininess and colour after deposition of the adhesion promoter (step (ii)) are maintained.

The current density applied the substrate comprising a chromium surface (the cathode) preferably ranges from 0.005 to 5 A/dm$^2$, more preferably from 0.01 to 2 A/dm$^2$ and most preferably from 0.02 to 1 A/dm$^2$.

No sufficiently increased adhesion between a substrate comprising a chromium surface and a lacquer is obtained when no external electrical current is applied between the substrate comprising a chromium surface and an anode in the presence of the aqueous solution comprising at least one phosphorous compound according to formulae 1 and/or 2 (Example 2) or when in addition an external electrical current is applied to the substrate comprising a chromium surface as the anode, and a cathode (Example 3).

The anode can be for example made of a material selected from stainless steel, platinum or platinized titanium.

The external electrical current is applied to the substrate comprising a chromium surface for 10 to 900 s, preferably from 15 to 600 s and more preferably from 30 to 300 s.

The temperature of the aqueous solution comprising at least one phosphorous compound according to formulae 1 and/or 2 is preferably held in the range of 20 to 80° C., more preferably of 30 to 70° C. and most preferably of 40 to 60° C. when contacting the substrate comprising a chromium surface with said aqueous solution.

In one embodiment of the present invention, the substrate comprising a chromium surface is immersed in the aqueous solution comprising at least one phosphorous compound according to formulae 1 and/or 2 and left therein for 1 to 900 s, preferably for 15 to 600 s and more preferably for 30 to 300 s before the external electrical current is passed through said substrate (as cathode), said aqueous solution and at least one anode as disclosed in the previous para-graphs.

The time and temperature ranges for the second step with external current in this embodiment of the present invention are the same as in case of the first embodiment, wherein the external current is directly switched on when the substrate comprising a chromium surface is contacted with the aqueous solution comprising at least one phosphorous compound according to formulae 1 and/or 2.

Optionally for all embodiments of the present invention, the substrate is dried between steps (ii) and (iii) in order to remove water and the optional co-solvent. Drying can be carried out for example in an air or nitrogen atmosphere in the temperature range of for example 20 to 120° C. and/or using compressed air.

Next, a lacquer is deposited onto the substrate comprising a chromium surface after treatment in the aqueous solution comprising at least one phosphorous compound according to formulae 1 and/or 2.

The words "paint" and "varnish" and their respective meaning are synonymous to the word "lacquer" for the method according to the present invention.

A lacquer deposited in step (iii) of the method according to the present invention increases the corrosion protection of the underlying substrate by serving as an additional barrier for corrosive media and/or changes the optical appearance of the substrate comprising a chromium surface in the desired way e.g. by a colour change.

Suitable lacquers for depositing onto the substrate in step (iii) comprise acrylic, polyurethane, epoxy resin and polyester resin lacquers.

The lacquer can be deposited in step (iii) by any conventional method such as dipping the treated substrate comprising a chromium surface into the lacquer, spraying and brushing.

The lacquer is then dried and cured by standard methods and information provided by the manufacturer of the respective lacquer.

One or more further layers of lacquer may be deposited onto the lacquer deposited onto the treated substrate comprising a chromium surface.

The adhesion between a substrate comprising a chromium surface and a lacquer deposited thereon is improved by the method according to the present invention. Furthermore, the optical appearance of the chromium surface is not changed after step (ii). This is of particular relevance in case an optically transparent lacquer is deposited onto the chromium surface and the appearance of the chromium surface should be maintained.

EXAMPLES

The invention will now be illustrated by reference to the following non-limiting examples.

Deposition of the lacquer (step (iii)) and corresponding adhesion tests were per-formed at Maier Technology Center (CTM), Poligono Industrial Arabieta S/N, 38320 Ajangiz, Bizkaia, Spain.

ABS substrates of the same size which comprise a multilayer coating of copper, semi-bright nickel, bright nickel, non-conductive particle containing nickel ("microporous nickel") and a top coat consisting of a chromium layer were used throughout all examples. The chromium layer was deposited from a bright trivalent chromium based electrolyte.

No treatment of the substrate comprising a chromium surface with an aqueous solution comprising at least one phosphorous compound according to formulae 1 and/or 2 was done in example 1.

No external electrical current was applied during step (ii) in example 2 and an anodic external electrical current (the substrate comprising a chromium surface served as the anode) was applied in example 3.

Examples 4 to 8 were conducted according to the method for increasing the adhesion between a chromium surface and a lacquer of the present invention.

A stainless steel anode was used in examples 4 to 8. The same material served as the cathode in example 3.

The substrates were dried at room temperature (20 to 23° C.) using compressed air after step (ii).

Next, a first polyurethane-based lacquer (thickness of the dried and coated first lacquer layer: 10 to 12 μm) followed by a second polyurethane-based lacquer (thickness of the dried and cured second lacquer layer: 20 μm) deposited thereon by spraying (manually) followed by drying and curing said two lacquer layers for 45 minutes at 80° C. in an oven with forced air circulation.

All substrates were then subjected to the test of water resistance of coatings using water immersion according to ASTM D870-09 at 45±2° C. for 7 days after step (iii).

Next, all substrates were then dried by wiping with a soft tissue without rubbing at room temperature and subjected to a cross-cut test (multi-blade cutting tool with 1 mm spacing between the blades)/tape test (adhesive tape) according to ISO 2409:2013. Accordingly, the results of the cross-cut test/tape test were ranked from "0" (very good adhesion) to "5" (no adhesion).

Example 1 (Comparative)

A bright chromium surface was investigated without applying step (ii).

The adhesion value obtained from the cross-cut test/tape test was "5" i.e. the parts failed the test. Accordingly, the adhesion between the substrate comprising a chromium surface and the lacquer is insufficient.

Example 2 (Comparative)

A bright chromium surface was treated with an aqueous solution comprising 0.093 wt.-% 1,10-decyldiphosphonic acid (phosphorous compound according to formula 1, $R^1=\!\!-\!\!(CH_2)_{10}P(O)(OH)_2$, $R^2$ and $R^3=H$), 0.75 wt.-% of an additive according to formula 9 and 0.6 wt.-% isopropylglycol for 120 s at 50° C. without applying an external electrical current between the substrate comprising a chromium surface and the anode.

The adhesion value obtained from the cross-cut test/tape test was "2" i.e. the parts failed the test. Accordingly, the adhesion between the substrate comprising a chromium surface and the lacquer is insufficient.

Example 3 (Comparative)

A bright chromium surface was treated with an aqueous solution comprising 0.093 wt.-% 1,10-decyldiphosphonic acid (phosphorous compound according to formula 1, $R^1=\!\!-\!\!(CH_2)_{10}P(O)(OH)_2$, $R^2$ and $R^3=H$), 0.75 wt.-% of an additive according to formula 9 and 0.6 wt.-% isopropylglycol for 15 s at 50° C. during which an external electrical current of 0.1 A/dm$^2$ was applied during said 15 s between the substrate comprising a chromium surface (anode), and a cathode.

A white discolouration was formed on the chromium surface during said treatment (step (ii)) which cannot be removed by rinsing with water. Accordingly, the anodic treatment of the chromium surface leads to an undesired change of the optical appearance of the chromium surface after deposition of the adhesion promoter.

Example 4 (Invention)

A bright chromium surface was treated with an aqueous solution comprising 0.093 wt.-% 1,10-decyldiphosphonic acid (phosphorous compound according to formula 1, $R^1=\!\!-\!\!(CH_2)_{10}P(O)(OH)_2$, $R^2$ and $R^3=H$), 0.75 wt.-% of an additive according to formula 9 and 0.6 wt.-% isopropylglycol for 15 s at 50° C. during which an external electrical current of 0.1 A/dm$^2$ was applied during said 15 s between the substrate comprising a chromium surface (cathode), and an anode.

No undesired change of the optical appearance of the chromium surface after step (ii) was observed.

The adhesion value obtained from the cross-cut test/tape test was "0" i.e. the parts passed the test. Accordingly, the adhesion between the substrate comprising a chromium surface and the lacquer is sufficient.

Example 5 (Invention)

A bright chromium surface was treated with an aqueous solution comprising 0.06 wt.-% 6-phosphonohexanoic acid (phosphorous compound according to formula 1 with $R^1=\!\!-\!\!(CH_2)_5COOH$, $R^2$ and $R^3=H$, 0.56 wt.-% of an additive according to formula 9 and 0.45 wt.-% isopropylglycol for 15 s at 50° C. during which an external electrical current of 0.4 A/dm$^2$ was applied during said 15 s between the substrate comprising a chromium surface (cathode), and an anode.

No undesired change of the optical appearance of the chromium surface after step (ii) was observed.

The adhesion value obtained from the cross-cut test/tape test was "0" i.e. the parts passed the test. Accordingly, the adhesion between the substrate comprising a chromium surface and the lacquer is sufficient.

Example 6 (Invention)

A bright chromium surface was treated with an aqueous solution comprising 0.06 wt.-% 2-carboxyethylphosphonic acid (phosphorous compound according to formula 1 with $R^1=\!\!-\!\!(CH_2)_2COOH$, $R^2$ and $R^3=H$, provided as Rhodafac® ASI HW, Rhodia), 0.75 wt.-% of an additive according to formula 9 and 0.6 wt.-% isopropanol for 30 s at 50° C. during which an external electrical current of 0.1 A/dm$^2$ was applied during said 30 s between the substrate comprising a chromium surface (cathode), and an anode.

No undesired change of the optical appearance of the chromium surface after step (ii) was observed.

The adhesion value obtained from the cross-cut test/tape test was "0" i.e. the parts passed the test. Accordingly, the adhesion between the substrate comprising a chromium surface and the lacquer is sufficient.

Example 7 (Invention)

A bright chromium surface was treated with an aqueous solution comprising 0.47 wt.-% 2-phosphonobutane-1,2,4-tricarboxylic acid (phosphorous compound according to formula 1 with $R^1=\!\!-\!\!C(CH_2COOH)(CH_2CH_2COOH)(COOH)$, $R^2$ and $R^3=H$, provided as Dequest® 7000, Italmatch Chemicals), 0.75 wt.-% of an additive according to formula 9 and 0.6 wt.-% isopropanol at 50° C. first for 120 s without applying an external electrical current and then for 30 s at 50° C. during which an external electrical current of 0.1 A/dm$^2$ was applied between the substrate comprising a chromium surface (cathode), and an anode.

No undesired change of the optical appearance of the chromium surface after step (ii) was observed.

The adhesion value obtained from the cross-cut test/tape test was "0" i.e. the parts passed the test. Accordingly, the adhesion between the substrate comprising a chromium surface and the lacquer is sufficient.

Example 8 (Invention)

A bright chromium surface was treated with an aqueous solution comprising 0.093 wt.-% o-phospho-D,L-serine (phosphorous compound according to formula 2 with $R^1=\!\!-\!\!CH_2CH(NH_2)COOH$, $R^2$ and $R^3=H$), 0.75 wt.-% of an additive according to formula 9 and 0.6 wt.-% isopropanol at 50° C. first for 120 s without applying an external electrical current and then for 15 s at 50° C. during which an external electrical current of 0.2 A/dm$^2$ was applied between the substrate comprising a chromium surface (cathode), and an anode.

No undesired change of the optical appearance of the chromium surface after step (ii) was observed.

The adhesion value obtained from the cross-cut test/tape test was "0" i.e. the parts passed the test. Accordingly, the adhesion between the substrate comprising a chromium surface and the lacquer is sufficient.

The invention claimed is:
1. A method for increasing the adhesion between a chromium surface and a lacquer comprising, in this order, the steps of
   (i) providing a substrate comprising a chromium surface,
   (ii) contacting said substrate with an aqueous solution comprising at least one phosphorous compound according to formulae 1 and/or 2:

$$R^1-P(O)(OR^2)(OR^3) \quad\quad 1$$

$$R^1-O-P(O)(OR^2)(OR^3) \quad\quad 2$$

wherein $R^1$ is a $C_1$ to $C_{12}$ alkyl group, linear, branched or cyclic and comprising at least one residue selected from the group consisting of phosphonate, phosphate, carboxylate, carboxyl, hydroxyl, amino, amide, thiol, nitrile, isonitrile, cyanate, isocyanate, epoxy, halogenide, alkenyl, ureido and thioureido, and $R^2$ and $R^3$ are independently selected from the group consisting of hydrogen, lithium, sodium, potassium, ammonium and $C_1$ to $C_4$ alkyl, wherein the $C_1$ to $C_{12}$ alkyl group in $R^1$ can be interrupted by —O— and/or —N($R^4$)— with $R^4$ selected from hydrogen and $C_1$ to $C_4$ alkyl,
   and at least one additive which increases the solubility of the at least one phosphorous compound according to formulae 1 and/or 2,
   while passing an electrical current through said substrate, at least one anode and the aqueous solution wherein said substrate serves as cathode and thereafter
   (iii) depositing a lacquer onto said substrate
   and thereby increasing the adhesion between said substrate and said lacquer.

2. The method for increasing the adhesion between a chromium surface and a lacquer according to claim 1 wherein $R^1$ in the at least one phosphorous compound according to formulae 1 and/or 2 is a $C_1$ to $C_{12}$ alkyl group, linear, branched or cyclic, comprising at least one residue selected from the group consisting of phosphonate, phosphate, carboxylate, carboxyl, hydroxyl and amino; and $R^2$ and $R^3$ are independently selected from the group consisting of hydrogen, lithium, sodium, potassium, ammonium and $C_1$ to $C_4$ alkyl.

3. The method for increasing the adhesion between a chromium surface and a lacquer according to claim 2 wherein the concentration of the at least one phosphorous compound according to formulae 1 and/or 2 in the aqueous solution ranges from 0.0001 to 0.5 mol/l.

4. The method for increasing the adhesion between a chromium surface and a lacquer according to claim 1 wherein the concentration of the at least one phosphorous compound according to formulae 1 and/or 2 in the aqueous solution ranges from 0.0001 to 0.5 mol/l.

5. The method for increasing the adhesion between a chromium surface and a lacquer according to claim 1 wherein the electrical current passed through the substrate ranges from 0.005 to 5 A/dm².

6. The method for increasing the adhesion between a chromium surface and a lacquer according to claim 1 wherein the aqueous solution is held during step (ii) at a temperature in the range of 20 to 80° C.

7. The method for increasing the adhesion between a chromium surface and a lacquer according to claim 1 wherein the substrate is contacted in step (ii) with the aqueous solution for 10 to 900 s.

8. The method for increasing the adhesion between a chromium surface and a lacquer according to claim 1 wherein the at least one anode is made from a material selected from the group consisting of stainless steel, platinum and platinized titanium.

9. The method for increasing the adhesion between a chromium surface and a lacquer according to claim 1 wherein the at least one additive which increases the solubility of the at least one phosphorous compound according to formulae 1 and 2 is a polyether compound.

10. The method for increasing the adhesion between a chromium surface and a lacquer according to claim 9 wherein the concentration of the at least one additive which increases the solubility of the at least one phosphorous compound according to formulae 1 and 2 ranges from 0.0001 to 0.1 mol/l.

11. The method for increasing the adhesion between a chromium surface and a lacquer according to claim 1 wherein the at least one additive which increases the solubility of the at least one phosphorous compound according to formulae 1 and 2 is selected from compounds represented by formula 3

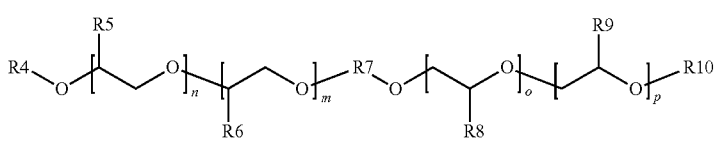

wherein m, n, o and p are integers ranging from 0 to 200 and are the same or different and m+n+o+p is at least 2,
and wherein R4 and R10 are the same or different and are selected from the group consisting of H, Li⁺, Na⁺, K⁺, NH₄⁺, $C_1$-$C_{20}$-alkyl, substituted or unsubstituted, linear or branched; $C_1$-$C_6$-alkaryl, linear or branched; allyl, aryl, sulfate, phosphate, halide and sulfonate,
and wherein each of the R5, R6, R8 and R9 groups may be the same or different and are selected from the group consisting of H and $C_1$-$C_6$-alkyl, wherein the alkyl is linear or branched, substituted or unsubstituted,
and wherein R7 is selected from the group consisting of $C_1$-$C_{12}$-alkylene, linear or branched, substituted or unsubstituted; arylene 1,2-, 1,3- and 1,4-substituted; naphthylene, 1,3-, 1,4-1,5-1,6- and 1,8-substituted; higher annulated arylene, cylcloalkylene, —CH₂—CH(CH₂(OCH₂CH₂)$_n$OR4)-, wherein R4 and n have the meaning defined above, and moieties represented by formula 4

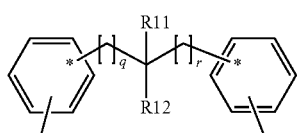

wherein the substitution independently is 1,2-, 1,3- or 1,4- for each ring and wherein q and r are the same or different and range independently from 0 to 10, and R11 and R12 are selected independently from the group consisting of H and $C_1$-$C_6$-alkyl, linear or branched.

12. The method for increasing the adhesion between a chromium surface and a lacquer according to claim 11 wherein the concentration of the at least one additive which increases the solubility of the at least one phosphorous compound according to formulae 1 and 2 ranges from 0.0001 to 0.1 mol/l.

13. The method for increasing the adhesion between a chromium surface and a lacquer according to claim 1 wherein the at least one additive which increases the solubility of the at least one phosphorous compound according to formulae 1 and 2 is selected from compounds according to the following formulae

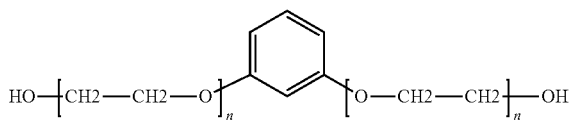

and wherein n ranges from 1 to 20,

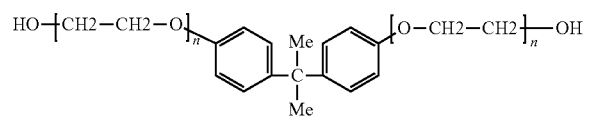

and wherein n ranges from 1 to 20,

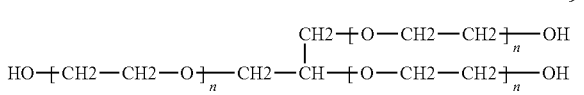

wherein n ranges from 1 to 20.

14. The method for increasing the adhesion between a chromium surface and a lacquer according to claim 13 wherein the concentration of the at least one additive which increases the solubility of the at least one phosphorous compound according to formulae 1 and 2 ranges from 0.0001 to 0.1 mol/l.

15. The method for increasing the adhesion between a chromium surface and a lacquer according to claim 1 wherein the concentration of the at least one additive which increases the solubility of the at least one phosphorous compound according to formulae 1 and 2 ranges from 0.0001 to 0.1 mol/l.

16. The method for increasing the adhesion between a chromium surface and a lacquer according to claim 1 wherein the aqueous solution further comprises a co-solvent selected from the group consisting of alcohols, alkyl ethers of glycols, ketones, esters and ethers.

17. The method for increasing the adhesion between a chromium surface and a lacquer according to claim 16 wherein the concentration of the co-solvent ranges from 0.0001 to 40 wt.-%.

18. The method for increasing the adhesion between a chromium surface and a lacquer according to claim 1 wherein the lacquer is selected from the group comprising acrylic, polyurethane, epoxy resin and polyester resin lacquers.

19. A method for increasing the adhesion between a chromium surface and a lacquer comprising, in this order, the steps of
(i) providing a substrate comprising a chromium surface deposited (a) by chemical and/or physical vapor deposition method, or (b) by electroplating from a plating bath composition comprising Cr(III) ions, Cr(VI) ions, or both Cr(III) ions and Cr(VI) ions,
(ii) contacting said substrate with an aqueous solution comprising at least one phosphorous compound according to formulae 1 and/or 2:

$R^1$—P(O)(O$R^2$)(O$R^3$)  1

$R^1$—O—P(O)(O$R^2$)(O$R^3$)  2 wherein $R^1$ is a $C_1$ to $C_{12}$ alkyl group, linear, branched or cyclic and comprising at least one residue selected from the group consisting of phosphonate, phosphate, carboxylate, carboxyl, hydroxyl, amino, amide, thiol, nitrile, isonitrile, cyanate, isocyanate, epoxy, halogenide, alkenyl, ureido and thioureido, and $R^2$ and $R^3$ are independently selected from the group consisting of hydrogen, lithium, sodium, potassium, ammonium and $C_1$ to $C_4$ alkyl, wherein the $C_1$ to $C_{12}$ alkyl group in $R^1$ can be interrupted by —O— and/or —N($R^4$)— with $R^4$ selected from hydrogen and $C_1$ to $C_4$ alkyl,
and at least one additive which increases the solubility of the at least one phosphorous compound according to formulae 1 and/or 2,
while passing an electrical current through said substrate, at least one anode and the aqueous solution wherein said substrate serves as cathode, wherein the electrical current passed through the substrate ranges from 0.005 to 5 A/dm², and thereafter
(iii) depositing a lacquer onto said substrate and thereby increasing the adhesion between said substrate and said lacquer.

20. The method for increasing the adhesion between a chromium surface and a lacquer according to claim 19, wherein in step (i) the chromium surface is deposited by electroplating from a plating bath composition comprising Cr(III) ions, Cr(VI) ions, or both Cr(III) ions and Cr(VI) ions.

* * * * *